United States Patent [19]

New

[11] Patent Number: 5,231,323
[45] Date of Patent: Jul. 27, 1993

[54] VIBRATION ISOLATED BACKUP BEARING FOR MAGNETIC BEARING

[75] Inventor: Nigel H. New, Harrow, United Kingdom

[73] Assignee: The Glacier Metal Company Limited, Middlesex, England

[21] Appl. No.: 829,265

[22] Filed: Feb. 3, 1992

[30] Foreign Application Priority Data

Feb. 15, 1991 [GB] United Kingdom ............ 9103257

[51] Int. Cl.⁵ .................... H02K 7/09; H02K 7/08
[52] U.S. Cl. ................................ 310/90.5; 310/90
[58] Field of Search .................. 310/51, 90, 90.5; 384/102, 126, 279, 298, 536, 909, 912

[56] References Cited

U.S. PATENT DOCUMENTS

| | | | |
|---|---|---|---|
| 4,601,591 | 7/1986 | Wright | 384/536 |
| 5,021,697 | 6/1991 | Kralick | 310/90.5 |
| 5,059,845 | 10/1991 | Wilson | 310/90.5 |

FOREIGN PATENT DOCUMENTS

| | | |
|---|---|---|
| 0165699 | 12/1985 | European Pat. Off. |
| 2127543A | 10/1972 | France |
| 58-65321A | 4/1983 | Japan |
| 2-72217 | 3/1990 | Japan |
| 0297250 | 4/1990 | Japan ............ 310/90.5 |
| 1381528 | 1/1975 | United Kingdom |
| 2033977 | 5/1980 | United Kingdom |

Primary Examiner—Steven L. Stephan
Assistant Examiner—C. LaBalle
Attorney, Agent, or Firm—Nixon & Vanderhye

[57] ABSTRACT

An assembly in which a rotating shaft is supported by a magnetic bearing has a backup bearing to support the shaft in the event of failure of the magnetic bearing. If the bearing portion of the backup bearing comprises a ball race, the radially outer raceway thereof is secured to an anchorage, such as a housing for the assembly. A low stiffness damper member in the form of an annular shaped body of resilient material also is included in the backup bearing, between the bearing portion thereof and the anchorage. Advantageously, when the magnetic bearing has failed, and the shaft is being brought to rest by being in contact with the backup bearing, the resilient body is in shear, and the body has a lower stiffness than otherwise would be the case. Thus, any tendency for the backup bearing, and/or the anchorage, to be damaged while the shaft is being brought to rest, is reduced, because the provision of the low stiffness damper causes the shaft to have a low natural frequency of oscillation.

4 Claims, 1 Drawing Sheet

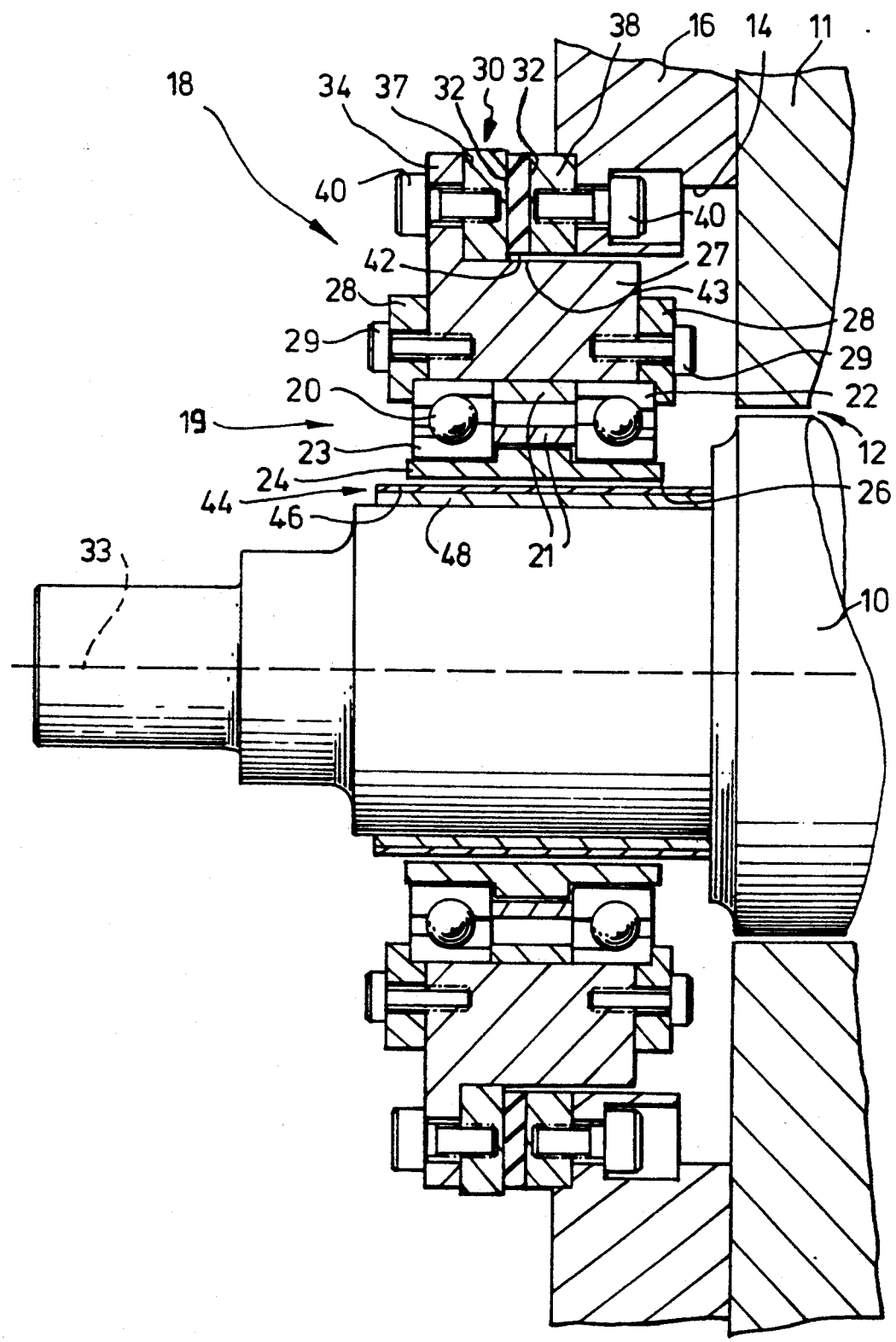

VIBRATION ISOLATED BACKUP BEARING FOR MAGNETIC BEARING

This invention relates to an assembly in which a rotating shaft is to be supported by a magnetic bearing, but is to be supported by a backup bearing in the event of failure of the magnetic bearing. A magnetic bearing may be provided for a shaft having high rotational energy, and it is especially important in such a case to provide a satisfactory backup bearing for the the shaft.

The backup bearing is required to be of a form to support the shaft in a satisfactory manner, and to enable the shaft to be brought to rest, after any failure in the operation of the associated magnetic bearing. While the shaft is being brought to rest it is required that the shaft, any part of assembly rotating with the shaft, and the backup bearing, do not become damaged, or worn.

It is known to have a backup bearing having at least one part with rolling elements, for example, each constituent part of the backup bearing comprising cylinders supported on a raceway; or comprising a ball race with radially inner and outer raceways; and possibly without the provision of any form of lubrication. The sole raceway, or the radially inner of two raceways, of each constituent part of the backup bearing is to rotate with the shaft when the magnetic bearing fails. If a radially outer raceway is provided it is secured to a suitable anchorage. Usually each radially inner raceway is provided with a sleeve of brass, or hard bronze, to facilitate the rotation of the raceway when the sleeve is contacted by the rotating shaft.

Alternatively, or in addition, the backup bearing may comprise, or include, a layer of dry bearing material such as may be included in a low friction plain bearing.

The clearance between the opposing surfaces of the backup bearing and the shaft is arranged to be less than the clearance between the rotating shaft and the magnetic bearing.

However, when the backup bearing is engaged by the shaft the backup bearing, and/or the anchorage therefor, may suffer damage.

Thus, it is an object of the present invention to provide a novel and advantageous construction for a backup bearing for an assembly in which a rotating shaft is to be supported by a magnetic bearing, the backup bearing construction being such that it and/or the anchorage therefor, does not tend to be damaged, or worn, when the backup bearing is engaged by the rotating shaft.

In accordance with the present invention an assembly in which a rotating shaft is to be supported by a magnetic bearing, includes a backup bearing having both a bearing portion, and between the bearing portion and an anchorage, a low stiffness damper member, comprising an annular shaped body of resilient material.

When the magnetic bearing fails, and the rotating shaft contacts the bearing portion of the backup bearing, there is a natural frequency of oscillations of the shaft, and this natural frequency is a function of the stiffness of the damper member. Further, the magnitude of the centrifugal forces imposed upon the bearing portion by the oscillating shaft is proportional to the square of the speed of rotation of the shaft. Thus, vibrations are forced on the shaft, and the frequency of such forced vibrations varies with the speed of the shaft. In addition, if the natural frequency associated with oscillations of the rotating shaft is approached by the frequency of the forced vibrations of the shaft, the magnitude of the centrifugal forces is such that the bearing portion, and/or the anchorage therefor, is likely to be damaged. However, if the frequency of the forced vibrations is significantly above the natural frequency of the shaft, the shaft will rotate about its centre of mass, and only a small force is transmitted to the bearing portion. Thus, by the provision of a low stiffness damper member, causing the natural frequency associated with oscillations of the rotating shaft to be correspondingly low, it can be arranged, in a convenient manner, that all expected forced vibrations of the rotating shaft have frequencies significantly greater than the natural frequency until the shaft is nearly stationary, when the magnitude of the centrifugal forces produced will be low due to the low shaft speed. Consequently, it can be arranged that the maximum possible amplitude of the centrifugal forces imposed upon the bearing portion is less than that which would damage the bearing portion, and/or the anchorage therefor.

The stiffness for the annular shaped resilient body, comprising the damper member, may be arranged to be lower than otherwise would be the case by the body being placed in shear when the magnetic bearing fails and the rotating shaft contacts the bearing portion. An advantagous arrangement is for the annular shaped resilient body to be placed in radial shear. Conveniently, the annular shaped body of resilient material is mounted with two opposing major faces of the body extending radially with respect to the axis of the body.

Both the shaft, and the bearing portion of the backup bearing, may extend through, and be coaxial with the axis of, the aperture through the annular shaped resilient body, the body has two opposing major faces, with one of the two opposing major faces secured to a flange secured to the bearing portion, and the other major face is secured to the anchorage. Any such construction for the assembly is advantageous in that the damper member is simple in form; and does not require much radially extending space within the assembly.

The present invention will now be described by way of example with reference to the accompanying drawing, comprising a partially sectioned, side elevation of part of one embodiment of an assembly in accordance with the present invention, showing a rotating shaft mounted within a magnetic bearing, and there being provided a backup bearing.

As shown in the accompanying drawing, an assembly includes a rotating steel shaft 10 mounted within a conventional magnetic bearing, indicated generally at 11, the gap between the magnetic bearing and the shaft being indicated at 12.

One end of the shaft 10 is illustrated, and this end protrudes through an aperture 14 in a part of a housing 16 for the assembly, only this part of the assembly housing being shown. Substantially within the aperture 14 in the anchorage comprising the housing 16 is provided a backup bearing structure for the assembly, the backup bearing structure being indicated generally at 18.

A rolling element bearing portion 19 of the backup bearing 18 includes two ball races, each having rolling elements 20 between radially inner and outer raceways. Each ball race is fabricated in a very precise manner, and no lubricant is provided therein. The two ball races are axially separated by two spacers 21. Each radially outer outer raceway 22 is secured within the aperture 14 in the assembly housing 16 in a manner described below.

Each radially inner raceway 23 engages a sleeve 24 comprising part of the bearing portion 19. The radially inner surface 26 of the sleeve 24 is opposite to the rotating shaft 10. When the assembly is in operation the surface 26 is spaced from the shaft. However, when the magnetic bearing 12 fails, the shaft contacts the surface 26 causing the radially inner raceways 23, and the rolling elements 20, to rotate therewith. In this way the shaft is to be brought to rest without damaging the magnetic bearing 11. In order to facilitate the rotation of the radially inner raceway 23 with the shaft 10, the sleeve 24 is of brass, or hard bronze.

When the magnetic bearing 11 fails, and the rolling element bearing portion 19 of the backup bearing 18 is brought into use, the shaft 10 oscillates. The shaft 10 imposes centrifugal forces on the rolling element bearing portion 19, possibly causing the bearing portion, and/or the housing 16 of the assembly, to become damaged.

It is known to provide a damper member to try to prevent these oscillations damaging the rolling element bearing portion 19. The natural frequency of oscillations of the shaft 10 is a function of the stiffness of the damper member. Further, the magnitude of the centrifugal forces imposed upon the rolling element bearing portion 19 by the oscillating shaft 10 is proportional to the square of the speed of rotation of the shaft. Thus, vibrations are forced on the shaft, and the frequency of such forced vibrations varies with the speed of the shaft. In addition, if the natural frequency associated with oscillations of the rotating shaft 10 is approached by the frequency of the forced vibrations of the shaft, the magnitude of the centrifugal forces is such that the rolling element bearing portion 19, and/or the housing 16 for the assembly, is likely to be damaged thereby. However, if the frequency of the forced vibrations is significantly above the natural frequency of the shaft, the shaft will rotate about its centre of mass, and only a small force is transmitted to the rolling element bearing portion 19.

It will be understood that, advantageously, if a low stiffness damper member is provided, the natural frequency associated with oscillations of the rotating shaft 10 is caused to be correspondingly low. In accordance with the present invention a low stiffness damper member 30 is provided, and the arrangement is such that the expected frequency of the forced vibrations is arranged to be significantly greater than the natural frequency of the shaft at least until the shaft is nearly stationary, when the magnitude of the centrifugal forces produced will be low due to the low shaft speed. In particular, the maximum possible amplitude of the centrifugal forces imposed upon the rolling element bearing portion 19 is less than that which would damage the bearing portion, and/or the housing 16 for the assembly.

In the illustrated arrangement, and in accordance with the present invention, the radially outer raceways 22 are secured to a sleeve 27 by end plates 28, bolts 29 securing the end plates to the sleeve with the ball races clamped between the end plates. The damper member 30 is provided between the sleeve 27 and the anchorage 16. The damper member 30 is considered to be a portion of the backup bearing structure 18. The damper member 30 comprises an annular shaped body of a resilient polymeric material, such as a suitable syntatic rubber, having high inherent damping properties. The annular resilient body 30 is mounted so that two opposing major faces 32 thereof extend radially with respect to the body. Further, both the axis 33 of the shaft 10, and of the rolling element bearing portion 19 of the backup bearing structure 18, are coaxial with the axis of the aperture through the annular shaped body 30. One of the major faces 32 of the resilient body 30 is contiguous with a radially extending flange 34 on the sleeve 27. The other major face 32 of the body 30 is secured to the assembly housing 16. The resilient body 30 is clamped between annular members 37 and 38, respectively, secured by bolts 40 to the flange 34, and to the assembly housing 16. The diameter of the annular member 37 is larger than that of the resilient body 30 and of the other annular member 38.

When the assembly is operating normally, the resilient body 30 has a low stiffness value, of the order of 2 Kilogrammes per micrometer. When the magnetic bearing 11 fails, and the rotating shaft 10 initially contacts the rolling element bearing portion 19, the resilient body 30 is caused to be in radial shear between the flange 34 and the assembly housing 16. The shaft natural frequency in this condition may be 20 Hertz and the shaft speed may be 12,000 revolutions per minute, giving a forcing frequency of 200 Hertz. Therefore there are negligible transposed forces. The maximum possible amplitude of the centrifugal forces imposed upon the rolling element bearing portion 19 throughout the period while the shaft 10 is being brought to rest is less than that which would damage the bearing portion, and/or the housing 16 for the assembly.

It is essential with the illustrated construction for the backup bearing structure 18 that the cylindrical, radially inner surface 42 of the resilient body 30 is spaced from a cylindrical, radially outer surface 43 of the sleeve 27. Further, it is required that, when the magnetic bearing is operating normally, the clearance 12 between the magnetic bearing 11 and the shaft 10 is greater than the sum of the clearance between the rolling element bearing portion 19 and the shaft, and the clearance between the cylindrical, radially inner surface 42 of the annular member 38 clamped to the resilient body 30 and the cylindrical, radially outer surface 43 of the the sleeve 27. Hence, the rotating shaft 10 is prevented from contacting the magnetic bearing 11 under any normally encountered operating condition of the assembly after the magnetic bearing has failed, and the shaft is brought to rest without any damage being caused to the magnetic bearing. In one example of the assembly, and with the assembly in operation, the clearance 12 between the magnetic bearing 11 and the shaft 10 is 0.5 millimeter; the clearance between the rolling element bearing portion 19 and the shaft is 0.2 millimeter; and the clearance between the cylindrical radially outer surface 43 of the sleeve 27, and the cylindrical, radially inner surface 42 of the resilient body 30 is 0.2 millimeter. The annular shaped resilient body 30 has an inner radius of 70 millimeters, an outer radius of 85 millimeters, and a thickness of 4 millimeters.

The rolling element bearing contacting part of the shaft 10, conveniently, comprises a layer 44, including a hard chromium surface layer 46 plated onto a layer 48 of an alloy of copper and chromium, having a Vickers hardness value of 130, and having a thermal conductivity of 0.95 calories per sec cm° C. Thus, the layer advantageously comprises a heat sink. Alternatively, the wear-resistant layer 46 may be of hardened steel, and the heat sink layer 48 is omitted.

Other modifications to the illustrated assembly are possible.

The annular shaped resilient body may be mounted within the assembly in any convenient manner. The arrangement may be such that the resilient body is in circumferential shear when the shaft is being brought to rest. Alternatively, the resilient body may not be placed in shear when the rotating shaft contacts the rolling element bearing portion 19.

The rolling element bearing portion of the back-up bearing may comprise any desired number of ball races. Otherwise the bearing portion may not comprise a ball race, or ball races, and, instead, may comprise any convenient form for a bearing having rolling elements, for example, comprising at least one bearing having rolling elements comprising cylinders supported on a single raceway to rotate with the shaft. Alternatively, the bearing portion of the back-up bearing may comprise at least part of a low friction plain bearing.

The stationary part 16 of the assembly may not comprise the housing for the assembly.

I claim:

1. In a magnetic bearing shaft assembly in which a rotatable shaft is supported by a magnetic bearing, and in which a back-up bearing is provided to prevent damage to the magnetic bearing in the event of failure of the magnetic bearing, the back-up bearing including a rotatable portion and a substantially stationary portion, an annular sleeve secured for rotation with said stationary portion, and with the annular sleeve being secured to an anchorage, the improvement comprising:

means inserted between said annular sleeve and said anchorage for preventing damage to said back-up bearing upon failure of said magnetic baring, said means comprising an annular resilient damper body of relatively low stiffness having opposing major faces extending in radial direction relative to an axis of said annular resilient body, such that, upon failure of said magnetic bearing, said annular resilient damper body is placed in shear;

the arrangement being such that a first radial clearance is provided between the rotatable shaft and the magnetic bearing, a second radial clearance is provided between the rotatable shaft and the rotatable portion of the back-up bearing, and a third radial clearance is provided to permit relative radial movement between said annular sleeve and the anchorage, wherein said first radial clearance is greater than a sum of said second radial clearance and said third radial clearance during normal operation of the assembly.

2. The assembly of claim 1 wherein the annular sleeve has a main body and a radial flange, said sleeve located radially between said substantially stationary portion and said annular, resilient damper body, and said annular resilient damper body is clamped between said radial flange and said anchorage.

3. The assembly of claim 2 wherein the third radial clearance is provided between said annular resilient damper body and a radially outer surface of said main body portion of said sleeve.

4. The assembly of claim 1 wherein said annular resilient damper body is a polymeric material and has a thickness of about 4 mm.

* * * * *